(12) United States Patent
Allen

(10) Patent No.: US 7,276,858 B2
(45) Date of Patent: Oct. 2, 2007

(54) DECORATIVE LIGHTING STRING WITH STACKED RECTIFICATION

(75) Inventor: David Allen, Yardley, PA (US)

(73) Assignee: Fiber Optic Designs, Inc., Yardley, PA (US)

( * ) Notice: Subject to any disclaimer, the term of this patent is extended or adjusted under 35 U.S.C. 154(b) by 17 days.

(21) Appl. No.: 11/260,167

(22) Filed: Oct. 28, 2005

(65) Prior Publication Data

US 2007/0096661 A1    May 3, 2007

(51) Int. Cl.
*H05B 37/00* (2006.01)
*F21V 33/00* (2006.01)

(52) U.S. Cl. .................. 315/205; 315/207; 315/200 R; 315/185 S; 315/312; 362/806; 362/800

(58) Field of Classification Search ................ 315/205, 315/207, 206, 200 R, 185 S, 200 A, 312, 315/324, 323, 322; 362/800, 808, 807, 812
See application file for complete search history.

(56) References Cited

U.S. PATENT DOCUMENTS

| | | |
|---|---|---|
| 3,758,771 A | 9/1973 | Frohardt et al. |
| 3,950,738 A | 4/1976 | Hayashi et al. |
| 4,223,248 A | 9/1980 | Tong |
| 4,271,408 A | 6/1981 | Teshima et al. |
| 4,298,869 A | 11/1981 | Okuno |
| 4,316,125 A | 2/1982 | Noguchi |
| 4,321,598 A | 3/1982 | Warner |
| 4,329,625 A | 5/1982 | Nishizawa et al. |
| 4,365,244 A | 12/1982 | Gillessen et al. |
| 4,367,471 A | 1/1983 | Gillessen |
| 4,396,823 A | 8/1983 | Nihei et al. |
| 4,420,251 A | 12/1983 | James et al. |
| 4,521,835 A | 6/1985 | Meggs et al. |
| 4,595,920 A | 6/1986 | Runyan |
| 4,652,981 A | 3/1987 | Glynn |
| 4,675,575 A | 6/1987 | Smith et al. |
| 4,727,603 A | 3/1988 | Howard |
| 4,753,546 A | 6/1988 | Witz et al. |
| 4,839,777 A | 6/1989 | Janko et al. |
| 4,843,280 A | 6/1989 | Lumbard et al. |

(Continued)

FOREIGN PATENT DOCUMENTS

CA        1118394        2/1982

(Continued)

OTHER PUBLICATIONS

Alderbrook Industries Ltd., 1998 Sales Catalogue, p. 16.

(Continued)

*Primary Examiner*—Tuyet Thi Vo
(74) *Attorney, Agent, or Firm*—Berenato, White & Stavish

(57) ABSTRACT

An improved decorative light string circuit comprises full bridge rectification located in or downstream of the front plug, wherein the rectification circuit contains one or more voltage reducing and/or filtering elements in order to reduce or limit LED drive current and reduce (filter) DC ripple and 1 or 2 LED series sets. Additional rectification circuits and LED series sets can be added in parallel to the first in "stacked mode", with each rectification circuit and LED series set electrically independent of prior and subsequent circuits. This eliminates the rectifying diode current summation load restrictions imposed by prior art and associated safety hazard due to diode overheating.

16 Claims, 5 Drawing Sheets

U.S. PATENT DOCUMENTS

| | | | |
|---|---|---|---|
| 4,857,920 A | 8/1989 | Kataoka et al. |
| 4,870,547 A | 9/1989 | Crucefix |
| 4,939,426 A | 7/1990 | Menard et al. |
| 4,954,822 A | 9/1990 | Borenstein |
| 4,959,766 A | 9/1990 | Jain |
| 4,984,999 A | 1/1991 | Leake |
| 5,027,037 A | 6/1991 | Wei |
| 5,087,212 A | 2/1992 | Hanami |
| 5,094,632 A | 3/1992 | Chen et al. |
| 5,130,897 A | 7/1992 | Kuzma |
| 5,155,669 A | 10/1992 | Yamuro |
| 5,187,377 A | 2/1993 | Katoh |
| 5,193,895 A | 3/1993 | Naruke et al. |
| 5,257,020 A | 10/1993 | Morse |
| 5,313,187 A | 5/1994 | Choi et al. |
| 5,323,305 A | 6/1994 | Ikeda et al. |
| 5,357,078 A | 10/1994 | Smith et al. |
| 5,366,780 A | 11/1994 | Rapisarda |
| 5,404,282 A | 4/1995 | Klinke et al. |
| 5,410,458 A | 4/1995 | Bell |
| 5,436,809 A | 7/1995 | Brassier et al. |
| 5,457,450 A | 10/1995 | Deese et al. |
| 5,463,280 A | 10/1995 | Johnson |
| 5,495,147 A | 2/1996 | Lanzisera |
| 5,504,398 A | 4/1996 | Rothenbuhler |
| 5,528,484 A | 6/1996 | Hayashi |
| 5,567,037 A | 10/1996 | Ferber |
| 5,639,157 A | 6/1997 | Yeh |
| 5,649,755 A | 7/1997 | Rapisarda |
| 5,661,645 A | 8/1997 | Hochstein |
| 5,663,719 A | 9/1997 | Deese et al. |
| 5,669,703 A | 9/1997 | Wheeler et al. |
| 5,726,535 A | 3/1998 | Yan |
| 5,762,419 A | 6/1998 | Yam |
| 5,806,965 A | 9/1998 | Deese |
| 5,808,592 A | 9/1998 | Mizutani et al. |
| 5,828,183 A | 10/1998 | Wang et al. |
| 5,887,967 A | 3/1999 | Chang |
| 5,920,827 A | 7/1999 | Baer et al. |
| 5,924,784 A | 7/1999 | Chliwnyj et al. |
| 5,936,599 A | 8/1999 | Reymond |
| 5,941,626 A | 8/1999 | Yamurd |
| 5,962,971 A | 10/1999 | Chen |
| 5,988,831 A | 11/1999 | Pan |
| 6,072,280 A | 6/2000 | Allen |
| 6,183,310 B1 | 2/2001 | Shu |
| 6,190,021 B1 | 2/2001 | Huang |
| 6,200,003 B1 | 3/2001 | Tseng |
| 6,261,019 B1 | 7/2001 | Furukawa |
| 6,361,198 B1 | 3/2002 | Reed |
| 6,461,019 B1 | 10/2002 | Allen |
| 6,505,954 B2 | 1/2003 | Chen |
| 6,659,622 B2 * | 12/2003 | Katogi et al. ............... 362/219 |
| 6,830,358 B2 | 12/2004 | Allen |
| 2002/0145874 A1 | 10/2002 | Kahl |
| 2002/0149938 A1 | 10/2002 | Allen |
| 2002/0191393 A1 | 12/2002 | Chen |
| 2003/0015968 A1 | 1/2003 | Allen |
| 2003/0147245 A1 | 8/2003 | Chen |
| 2005/0110426 A1 * | 5/2005 | Shao ..................... 315/185 R |
| 2005/0168156 A1 | 8/2005 | Li et al. |

FOREIGN PATENT DOCUMENTS

| | | |
|---|---|---|
| EP | 0 805 304 A2 | 11/1997 |
| GB | 2264555 | 9/1993 |
| JP | A 58-119682 | 7/1983 |
| JP | A 3-273495 | 12/1991 |
| WO | WO 00/13469 | 3/2000 |

OTHER PUBLICATIONS

Pages from Canadian Tourism Commission web-site, www.travelcanada.ca, 5 pages, dated Jul. 23, 2004.

Pages from www.kropla.com web site, 9 pages, dated Jun. 5, 2004.

"MicroElectronics Circuits", Third Edition, Sendra & Smith, Saunders College Publishing, 1991, pp. 126-128, and Exercise 3.12 on pp. 136-137.

"Optoelectronics/Fiber-Optics Applications Manual", Second Edition, McGraw-Hill Book Company, 1981, pp. 2.18-2.19.

A Canadian Standards Association Approval Form, dated Jun. 5, 1998.

* cited by examiner

DECORATIVE LIGHTING STRING WITH STACKED RECTIFICATION

FIELD OF THE INVENTION

The present invention relates to the field of decorative LED light strings and particularly an improved circuit to be used to connect LED light strings having one or more series connection.

BACKGROUND

LEDs are becoming increasingly popular as a light source in decorative and Christmas lights due to their reliability, energy savings, longevity, and cool operation. Manufacturers of decorative light strings are constantly working to maximize the brightness and benefits of LEDs as a light source as well as reduce production cost to narrow the gap between traditional, incandescent and LED light string cost.

It is known in the art the use of a DC power supply to power LED lamps maximize LED brightness and longevity. However, prior art discloses the use of a full bridge rectification circuit that requires additional wires and/or places undue current load on rectifying diodes, detracting from the appearance of the light string and creating a potential safety hazard.

FIG. 1 shows a prior art embodiment of an LED light string comprising a light string requiring 4 conductor wires when a single series block of LED lamps and an end connector is employed. Five (5) conductor wires are required when two or more series blocks of LED lamps are employed.

FIGS. 2A and 2B also show prior art embodiments of LED light strings. The prominent feature of these prior arts is circuit rectification wherein the rectifying diodes are installed in split pairs in an attempt to save wire, thus reducing cost. However according to the embodiment of FIG. 2A of the inventions, three (3) conductor wires and a "dummy plug" is required when the light string does not have an end connector. According to the embodiment of FIG. 2B of this invention the number of conductor wires required in the manufacture of the light chain increases one-for-one with each parallel connected series block of LEDs added to the lighting chain. Thus, a light string employing 2 series blocks of LED lamps requires 4 conductor wires (3 series blocks require 5 conductor wires, etc.). The invention disclosed defeats the wire saving purpose, adds cost, places severe limitations on the design, and complicates the manufacturing process.

Both of the light string designs shown in FIG. 1 and FIGS. 2A and 2B create a safety hazard when additional series blocks of LED lamps are employed. The AC to DC converter (rectifying diodes) will quickly overheat due to the increased electrical load (current summation) imposed by the additional parallel connected series blocks of LED lamps. Accordingly, both of these designs have severe limitations.

In addition, reduction of DC ripple is highly desirable in order to minimize LED peak current, thus reducing stress on the LED lamps and maximizing longevity. This has not been addressed by the prior art.

SUMMARY OF THE INVENTION

In view of the disadvantages of the prior art, the object of the present invention is to provide an improved decorative light string circuit that can solve the problems mentioned previously.

To attain the aforesaid object, the present invention comprises full bridge rectification located in or downstream of the front plug, said rectification circuit containing one or more voltage reducing and/or filtering elements in order to reduce or limit LED drive current and reduce (filter) DC ripple and 1 or 2 LED series sets. Additional rectification circuits and LED series sets can be added in parallel to the first in "stacked mode", with each rectification circuit and LED series set electrically independent of prior and subsequent circuits. This eliminates the rectifying diode current summation load restrictions imposed by prior art and associated safety hazard due to diode overheating.

Another advantage of the present invention is nearly unlimited design flexibility whereas prior art has significant limitations. For example a light string can be manufactured without a cord connector using only 2 wires, eliminating the third conductor wire and dummy plug requirement of the prior art shown in FIG. 2. A light string with a cord connector can be manufactured with one or two blocks of series connected LED lamps without adding components, or can be manufactured as a continuous roll with a nearly unlimited number of parallel connections, with or without a cord connector that is simply cut to the desired length according to the stacking aspect of the invention. A continuous roll of lighting string can therefore be manufactured limited only by the allowable Wattage rating of conductor wire or fuses.

In addition, since each bridge and LED series circuit is electrically independent parallel connected series blocks of LEDs can have varying number of serially connected LEDs within the same light string. For example series block #1 could have 75 LED lamps in series with parallel connected series block #2 having only 25 LED lamps in series and parallel connected series block #3 having 50 LED lamps in series.

In one embodiment of the invention unused DC output terminals can be optionally used to power a variety of add-on components such as music, flashing, fading, animation, or independent current control such as an FET requiring an independent voltage source without affecting the lighting string, furthering the design flexibility aspect of the invention. These optional aspects are not possible in prior art.

Manufacturing cost is significantly reduced as the number of conductor wires does not increase as the number of LED series blocks connected in parallel increases. The prior art shown in FIG. 1 requires 5 conductor wires when multiple series blocks of LED lamps are connected in parallel. Prior art shown in FIG. 2 requires 1 additional conductor wire for each parallel connected series block of LED lamps. The present invention requires as few as 2 or 3 conductor wires regardless of the number of parallel connections employed.

Manufacturing is greatly simplified and made more efficient as the same electrical circuit is used repeatedly. This allows mass production of common electrical components.

This invention, as well as its advantages will become apparent to one of ordinary skill in the art upon review of the included description and figures.

BRIEF DESCRIPTIONS OF THE DRAWINGS

DETAILED DESCRIPTION OF THE PREFERRED EMBODIMENT

Figure 1:
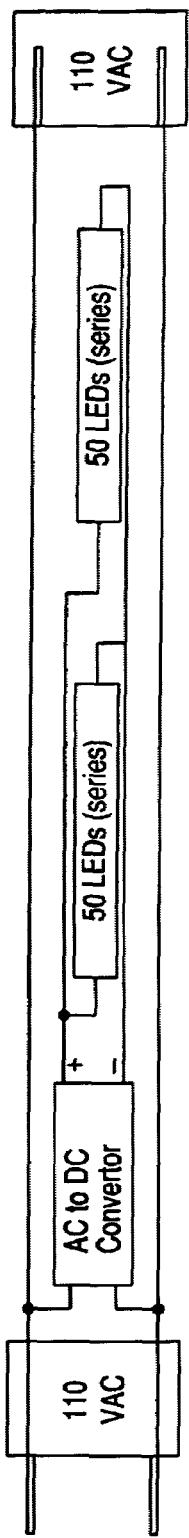
FIG. 1 is a prior art schematic circuit diagram of a decorative light string.

Reference will now be made to the exemplary embodiments illustrated in the drawings, and specific language will be used herein to describe the same.

Figure 4A:
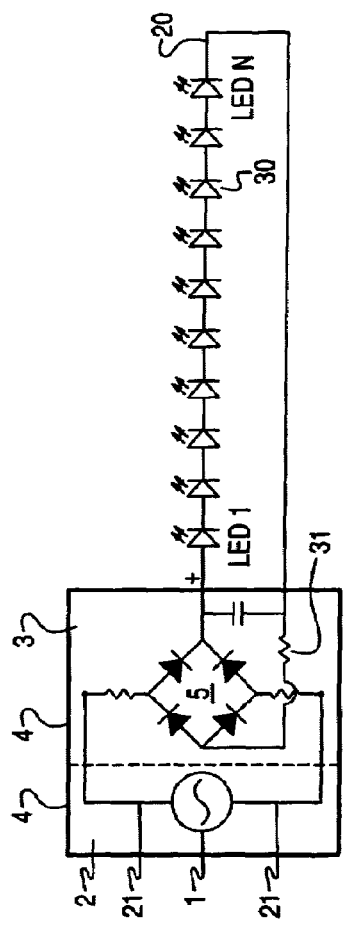
FIGS. 4A-4C is schematic circuit diagrams of this invention.
Figure 4B:
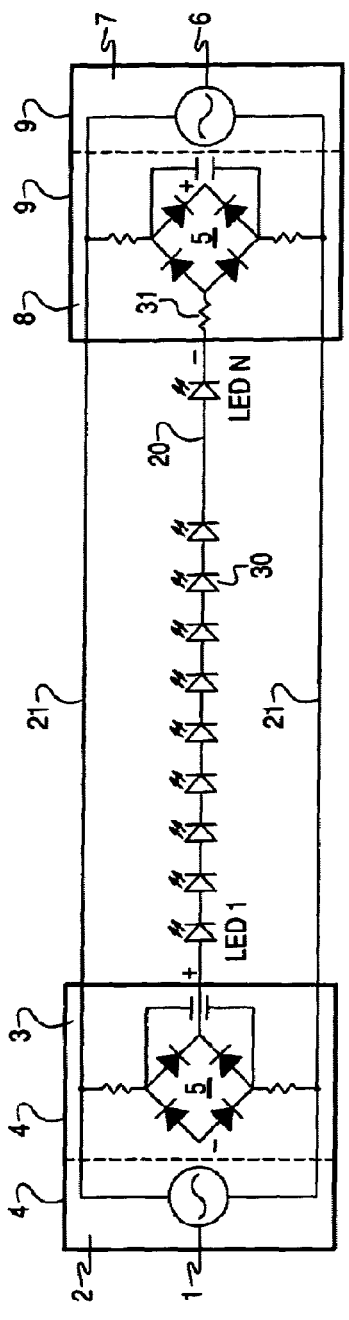
Figure 4C:
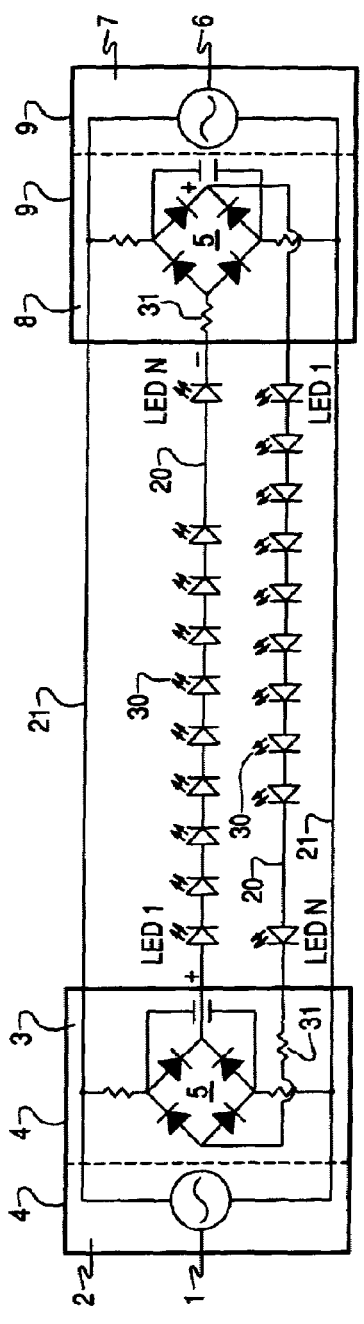

As shown in FIGS. 4A-4C, the LED light string includes a common household AC input voltage source (01), AC plug (02), front rectification and control circuit (03), parallel conductor wires (21), series conductor wires (20), plurality of series connected LED lamps (30), series resistance (31), rear rectification and control circuit (08), end connector plug (07) incorporating exit AC voltage (06) for powering additional light strings.

Front rectification and control circuit (03) comprises a full bridge rectifier (05) drawing AC input voltage from parallel conductors (21) via one or more optional resistors (2 are shown in all figures) in order to reduce DC output voltage. The positive DC output terminal of rectifier (05) provides positive DC power to series conductor (20) containing a plurality of serially connected LED lamps (30) containing series resistor (31). A varistor, capacitor, current saturated transistor, current limiting diode (CLD) or other impedance device can be substituted for one or more of the resistors shown.

Figure 5A:
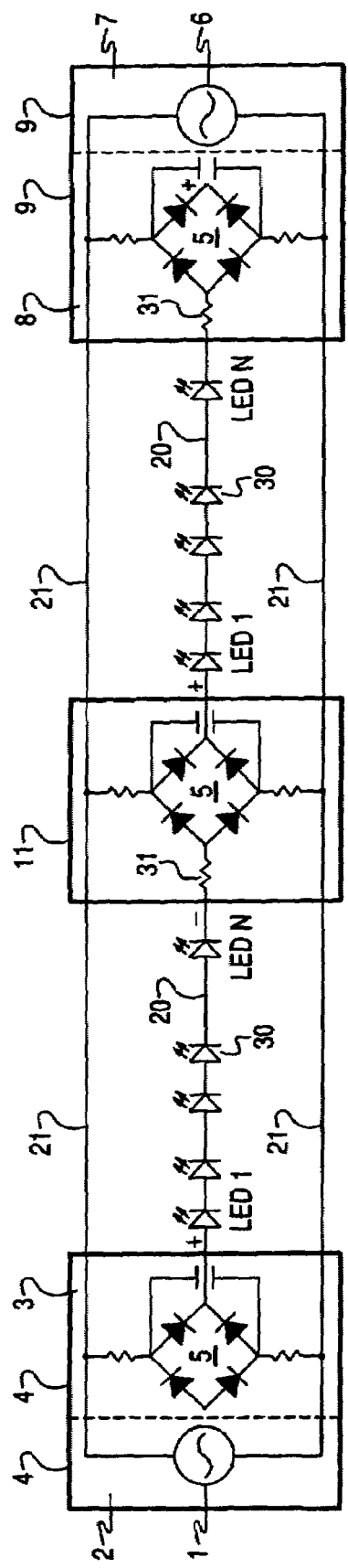
FIG. 5A is an electrical schematic circuit diagram of this invention.
Figure 5B:
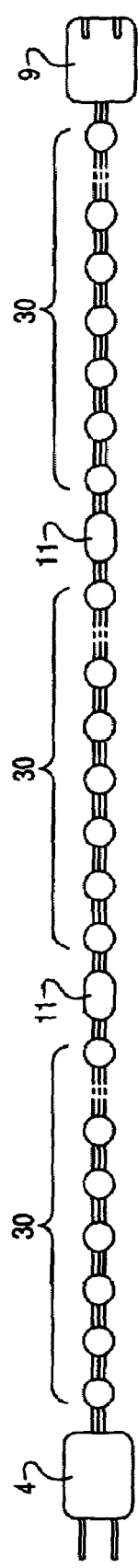
FIG. 5B illustrates a physical embodiment of the circuit diagram shown in FIG. 5A.

Series conductor wire (20) then returns to the front rectifier (05) negative DC terminal as shown in FIG. 4A, or subsequent rectifier (05) negative terminal as shown in FIGS. 4B, 4C, and 5 in order to complete the circuit. An optional DC ripple filtering capacitor is connected in parallel across rectifier (05) DC terminals as in FIG. 4A, or in parallel across rectifier (05) AC terminals as shown in FIGS. 4B, 4C, and 5A-5B. Although this element is not necessary to the operation of the circuit it is highly desirable as it reduces peak LED drive current, thus maximizing LED longevity.

Figure 2:
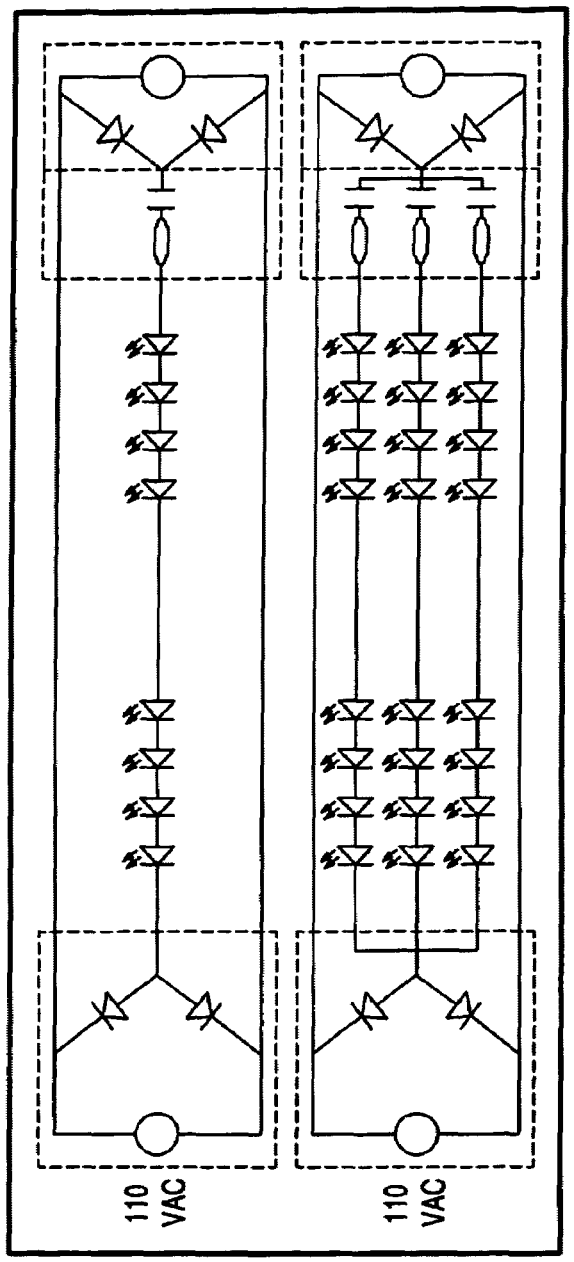
FIGS. 2A and 2B are prior art schematic circuit diagrams of decorative light strings.
Figure 3C:
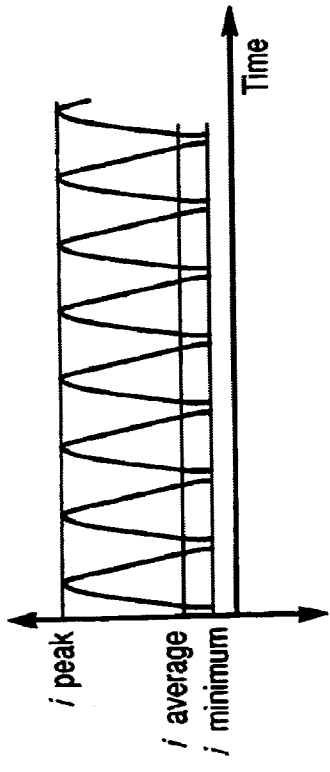
FIG. 3C shows the LED current of prior art FIG. 2.
Figure 3D:
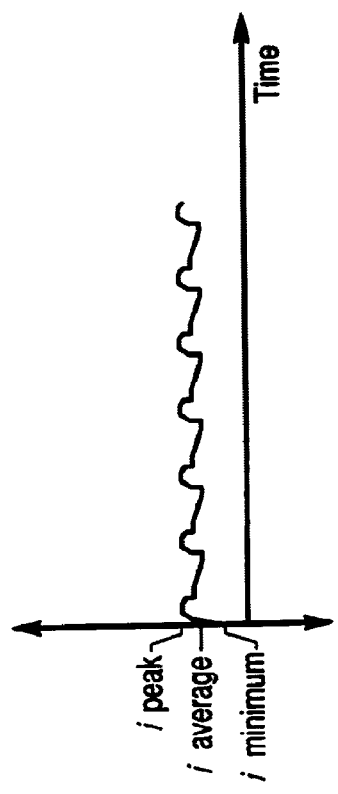
FIG. 3D shows the LED current of this invention.
Figure 3A:
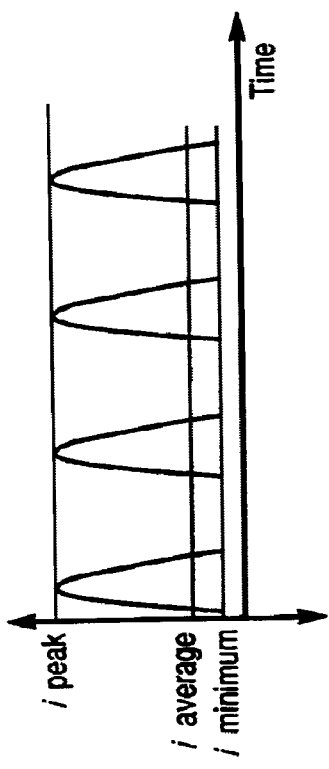
FIG. 3A shows LED current of an AC powered LED light string.
Figure 3B:
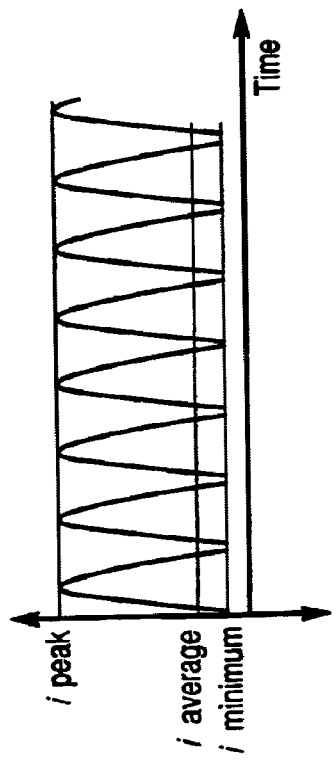
FIG. 3B shows the LED current of prior art FIG. 1.

A pictorial example of minimum, average, and peak LED drive current is shown in FIG. 3. FIG. 3A represents AC driven LED lamps, FIG. 3B represents the DC driven LED current of prior art FIG. 1, FIG. 3C represents the DC driven LED current of prior art FIG. 2, FIG. 3D represents the filtered, DC drive current of this invention.

Rear rectifier (05) and control circuit (08) are shown in FIG. 4B, 4C, and rear rectifier (05) and control circuit (08) are the mirror image of front rectifying and control circuit (02) and would be located in or upstream of rear cord connector (07). Front circuit (03) can be incorporated into plug (02) forming plug with integral circuit control (04). Rear circuit (08) can be incorporated into end connector (07) forming connector with integrated circuit control (09)

FIG. 4B illustrates this invention in its most basic form. Note that the negative DC terminal of front rectification and control circuit (03) and positive DC terminal of rear rectification and control circuit (08) are optionally used. This is intentional as these terminals can be used to power a parallel series block of LED lamps, minimizing conductor wire and component cost as shown in FIG. 4C, or form the basis for the stacked rectification mode aspect of this invention, utilizing up to 250 parallel connected series blocks of LED lamps (assuming a 5 A circuit, 20 mA LED current) as shown in FIG. 5A.

FIGS. 5A and 5B contains schematic drawing and functional example of an LED light string utilizing the stacked rectification aspect of this invention. Rectification and control circuits (03), (11), and (08) are identical. This arrangement greatly simplifies manufacturing, allowing parallel connections of serially connected LEDs to be added with ease and minimized manufacturing cost.

Figure 6:
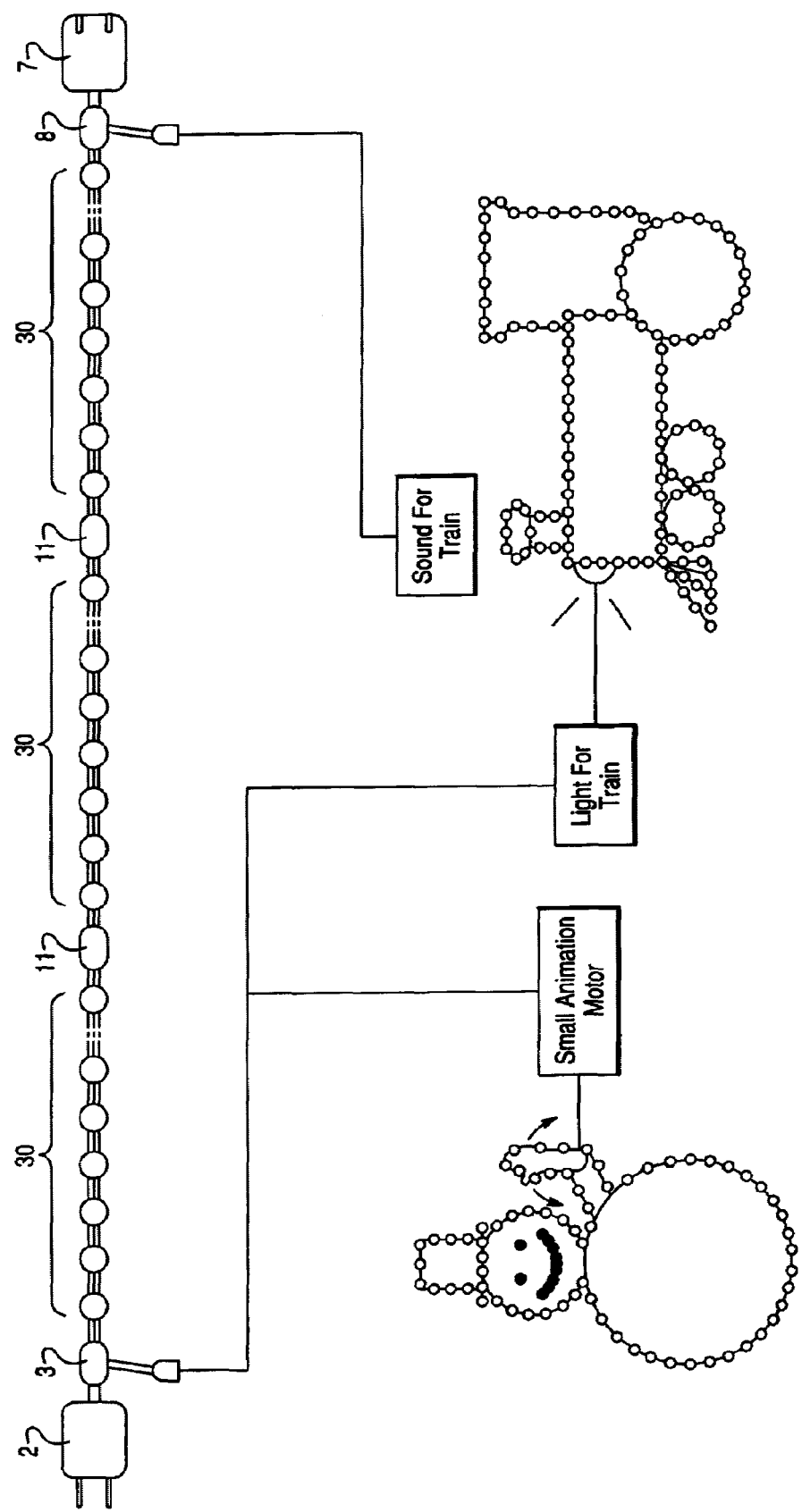
FIG. 6 shows example optional accessories.

The unused DC terminals shown in FIG. 4B and FIG. 5A can also be used to power an FET requiring an independent power source in order to manufacture a constant current light string independent of AC input voltage. These terminals can also be used to power add-on accessories, saving additional component and labor cost. Examples of add-on accessories are shown in FIG. 6.

Naturally, the polarity of components and series connected LEDs can be reversed. Positive DC connections were illustrated first for consistency of illustration only.

It is to be understood that the above-referenced arrangements are illustrative of the application of the principles of the present invention. It will be apparent to those of ordinary skill in the art that numerous modifications can be made without departing from the principles and concepts of the invention as set forth in the following claims.

The invention claimed is:

1. An LED light string comprising:
    an AC input voltage input having a positive terminal and a negative terminal;
    parallel conductor wires electrically connected to the positive and negative terminals of the AC voltage input;
    a front rectification and control circuit defines a full wave rectifier comprising four front rectifying diodes electrically connected to the parallel conductor wires;
    series conductor wires electrically connected to ends of each of two rectifying diodes of said front rectification and control circuit;
    a rear rectification and control circuit comprising four rear rectifying diodes electrically connected to the parallel conductor wires;
    at least one junction box interposed between said front and rear rectification and control circuits, said junction box comprising four junction diodes,
        wherein positive ends of first two junction diodes being connected in parallel and with negative ends of the first two junction diodes being connected with the positive and negative terminals of the AC voltage input respectively, and
        wherein negative ends of second two junction diodes being connected together in parallel and positive ends of the second two junction diodes being connected with the positive and negative terminals of the AC voltage input respectively;
    a first LED serial set connected between rectifying diodes of the front rectification and control circuit and the first two junction diodes; and
    a second LED serial set connected between the second two junction diodes and rectifying diodes of the rear rectification and control circuit.

2. The LED light string according to claim 1, further comprising a series resistance is series with at least one of said first and second LED serial sets.

3. The LED light string according to claim 1, further comprising one of a varistor, capacitor, current saturated transistor, current limiting diode (CLD) or other impedance device in series with said first and second LED serial sets.

4. The LED light string according to claim 1, wherein said AC voltage input comprises a front end connector plug.

5. The LED light string according to claim 4, wherein said series resistance, rear rectification and control circuit, and said end connector plug incorporating exit AC voltage for powering additional light strings.

6. The LED light string according to claim 1, wherein said front rectification and control circuit draws AC input voltage from said parallel conductor wires via at least one resistor in order to reduce DC output voltage.

7. The LED light string according to claim 1, wherein a positive DC output terminal of said front rectification and control circuit provides positive DC power to said first LED serial set.

8. The LED light string according to claim 1, wherein a negative DC output terminal of said front rectification and control circuit provides negative DC power to said first LED serial set.

9. The LED light string according to claim 1, further comprising a DC ripple filtering capacitor connected in parallel across DC terminals of said front rectification and control circuit.

10. The LED light string according to claim 1, further comprising a DC ripple filtering capacitor connected in parallel across AC terminals of said front rectification and control circuit.

11. The LED light string according to claim 1, further comprising at least one accessory electrically connected to DC terminals of said front rectification and control circuit.

12. The LED light string according to claim 1, further comprising a parallel series block of LED lamps electrically connected to DC terminals of said front rectification and control circuit.

13. The LED light string according to claim 1, wherein said first LED serial set is connected between the positive ends of rectifying diodes of the front rectification and control circuit and the negative ends of the first two junction diodes.

14. The LED light string according to claim 1, wherein said second LED serial set is connected between the positive ends of the second two junction diodes and the negative ends of the rectifying diodes of the rear rectification and control circuit.

15. The LED light string according to claim 1, wherein said first LED serial set is connected between the negative ends of rectifying diodes of the front rectification and control circuit and the positive ends of the first two junction diodes.

16. The LED light string according to claim 1, wherein said second LED serial set is connected between the negative ends of the second two junction diodes and the positive ends of the rectifying diodes of the rear rectification and control circuit.

* * * * *